(12) United States Patent
Wang

(10) Patent No.: US 11,316,551 B2
(45) Date of Patent: Apr. 26, 2022

(54) CO-TIME CO-FREQUENCY FULL DUPLEXING SYSTEM AND MOBILE TERMINAL

(71) Applicant: VIVO MOBILE COMMUNICATION CO., LTD., Chang'an Dongguan (CN)

(72) Inventor: Baigang Wang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 5 days.

(21) Appl. No.: 16/624,546

(22) PCT Filed: May 21, 2018

(86) PCT No.: PCT/CN2018/087643
§ 371 (c)(1),
(2) Date: Dec. 19, 2019

(87) PCT Pub. No.: WO2018/233422
PCT Pub. Date: Dec. 27, 2018

(65) Prior Publication Data
US 2020/0127699 A1  Apr. 23, 2020

(30) Foreign Application Priority Data
Jun. 22, 2017 (CN) .......................... 201710480593.X

(51) Int. Cl.
*H04B 1/44* (2006.01)
*H04L 5/14* (2006.01)

(52) U.S. Cl.
CPC ............ *H04B 1/44* (2013.01); *H04L 5/1423* (2013.01); *H04L 5/1461* (2013.01)

(58) Field of Classification Search
CPC ....................................................... H04B 1/44
See application file for complete search history.

(56) References Cited

U.S. PATENT DOCUMENTS 5,408,204 A * 4/1995 Feldle .................. H03G 11/025
333/17.2
5,923,647 A * 7/1999 Dolman .................... H04B 1/48
370/280

(Continued)

FOREIGN PATENT DOCUMENTS

CN 103338172 A 10/2013
CN 103957182 A 7/2014

(Continued)

OTHER PUBLICATIONS

1st Chinese Office Action for Chinese Application No. 201710480593.X, dated Nov. 22, 2018 (dated Nov. 22, 2018)—8 pages (English translation—8 pages).

(Continued)

*Primary Examiner* — Kodzovi Acolatse
*Assistant Examiner* — Abdeltif Ajid
(74) *Attorney, Agent, or Firm* — Culhane Meadows PLLC; Stephen J. Weed

(57) ABSTRACT

Provided are a co-time co-frequency full duplexing system and a mobile terminal. The co-time co-frequency full duplexing system includes a baseband processing circuit, a transmitting terminal signal processing circuit, a receiving terminal signal transmission circuit, a signal transceiver circuit. A first end of the baseband processing circuit is electrically connected to a first end of the transmitting terminal signal processing circuit, a second end of the transmitting terminal signal processing circuit is electrically connected to a first end of the signal transceiver circuit, a second end of the baseband processing circuit is electrically connected to a first end of the receiving terminal signal processing circuit, a second end of the receiving terminal signal processing circuit is electrically connected to a second end of the signal transceiver circuit. The signal transceiver circuit transmits an uplink signal and receive a downlink (Continued)

signal simultaneously, and isolate the uplink signal from the downlink signal. In the above technical solution, the signal transceiver circuit may transmit the uplink signal and receive the downlink, and isolate the uplink signal from the downlink signal. It is able to achieve the self-interference suppression, and simplify a link.

14 Claims, 2 Drawing Sheets

(56) References Cited

U.S. PATENT DOCUMENTS

| | | | |
|---|---|---|---|
| 2008/0008126 A1* | 1/2008 | Shirakabe | H04B 7/2615 370/329 |
| 2014/0128008 A1 | 5/2014 | Cox et al. | |
| 2014/0348018 A1* | 11/2014 | Bharadia | H04L 5/1423 370/252 |
| 2015/0318976 A1* | 11/2015 | Eltawil | H04B 1/123 370/278 |
| 2015/0373643 A1* | 12/2015 | Talty | H04B 1/0475 370/311 |
| 2016/0285502 A1* | 9/2016 | Liu | H04L 5/143 |
| 2017/0170903 A1* | 6/2017 | Jain | H04B 10/25752 |
| 2017/0338853 A1* | 11/2017 | He | H04L 12/10 |
| 2019/0013923 A1* | 1/2019 | Liu | H04B 1/525 |

FOREIGN PATENT DOCUMENTS

| | | |
|---|---|---|
| CN | 104779971 A | 7/2015 |
| CN | 105978602 A | 9/2016 |
| CN | 105991170 A | 10/2016 |
| KR | 1020160150592 A | 12/2016 |

OTHER PUBLICATIONS

International Search Report and Written Opinion for International Application No. PCT/CN2018/087643, dated Jan. 2, 2020 (dated Jan. 2, 2020)—9 pages (English translation—6 pages).

Wu Xiang-yu et al.: "Measurement and Modeling of Co-Time Co-Frequency Single Antenna Full-Duplex Self-Interference Channel in Indoor Environment," Systems Engineering and Electronics, vol. 37, No. 9, Sep. 30, 2015, pp. 2148-2155.

Extended European Search Report for European Application No. 18819614.1, dated Jul. 28, 2020 (dated Jul. 28, 2020)—7 pages.

* cited by examiner

CO-TIME CO-FREQUENCY FULL DUPLEXING SYSTEM AND MOBILE TERMINAL

TECHNICAL FIELD

The present invention relates to the field of communication technology, in particular to a co-time co-frequency full duplexing system and a mobile terminal.

BACKGROUND

A $5^{th}$-Generation (5G) mobile communication system needs to support a higher uplink/downlink transmission rate, so it is necessary to provide a larger bandwidth and a higher spectrum utilization rate. A current $4^{th}$-Generation (4G) Long Term Evolution (LTE) communication system merely supports a Time Division Duplexing (TDD) or Frequency Division Duplexing (FDD) mode, resulting in inflexible configuration and a low spectrum utilization rate. Hence, as one of the critical 5G techniques, a co-time co-frequency full duplexing technique has been presented, so as to perform uplink transmission and downlink transmission at a same frequency simultaneously. For a co-time co-frequency full duplexing system in prior art, in order to achieve self-interference suppression (i.e., an interference caused by a transmission signal on a reception signal), a transmission antenna needs to be separated from a reception antenna. i.e., an isolation between the antennae is achieved through spatial separation. In this regard, during the link implementation, two co-frequency filters and two sets of antenna switches need be provided, resulting in a complex link and high cost.

SUMMARY

An object of the present invention is to provide a co-time co-frequency full duplexing system and a mobile terminal, so as to solve a problem that a radio frequency (RF) link is complex and the cost is high in the co-time co-frequency full duplexing system of the prior art.

In one aspect, the present invention provides in some embodiments a co-time co-frequency full duplexing system, including a baseband processing circuit, a transmitting terminal signal processing circuit, a receiving terminal signal transmission circuit and a signal transceiver circuit. A first end of the baseband processing circuit is electrically connected to a first end of the transmitting terminal signal processing circuit, a second end of the transmitting terminal signal processing circuit is electrically connected to a first end of the signal transceiver circuit, a second end of the baseband processing circuit is electrically connected to a first end of the receiving terminal signal processing circuit, and a second end of the receiving terminal signal processing circuit is electrically connected to a second end of the signal transceiver circuit. The signal transceiver circuit is used for transmitting an uplink signal and receive a downlink signal simultaneously, and isolating the uplink signal from the downlink signal.

In another aspect, the present invention provides in some embodiments a mobile terminal including the above-mentioned co-time co-frequency full duplexing system.

According to the embodiments of the present invention, the signal transceiver circuit may transmit the uplink signal and receive the downlink, and isolate the uplink signal from the downlink signal. As a result, it is able to achieve the self-interference suppression, simplify a link and reduce the cost.

BRIEF DESCRIPTION OF THE DRAWINGS

In order to illustrate the technical solutions of the present invention in a clearer manner, the drawings desired for the present invention will be described hereinafter briefly. Obviously, the following drawings merely relate to some embodiments of the present invention, and based on these drawings, a person skilled in the art may obtain other drawings without any creative effort.

DETAILED DESCRIPTION

Hereinafter, the exemplary embodiments of the present invention are described in detail with reference to the accompanying drawings. It should be appreciated that, although the exemplary embodiments of the present invention are illustrated in the accompanying drawings, the disclosure may, however, be embodied in many different forms and should not be construed as being limited to the embodiments set forth herein. Rather, these embodiments are provided so that the present invention will be thorough, and will fully convey the scope of the present invention to a person skilled in the art.

Figure 1:
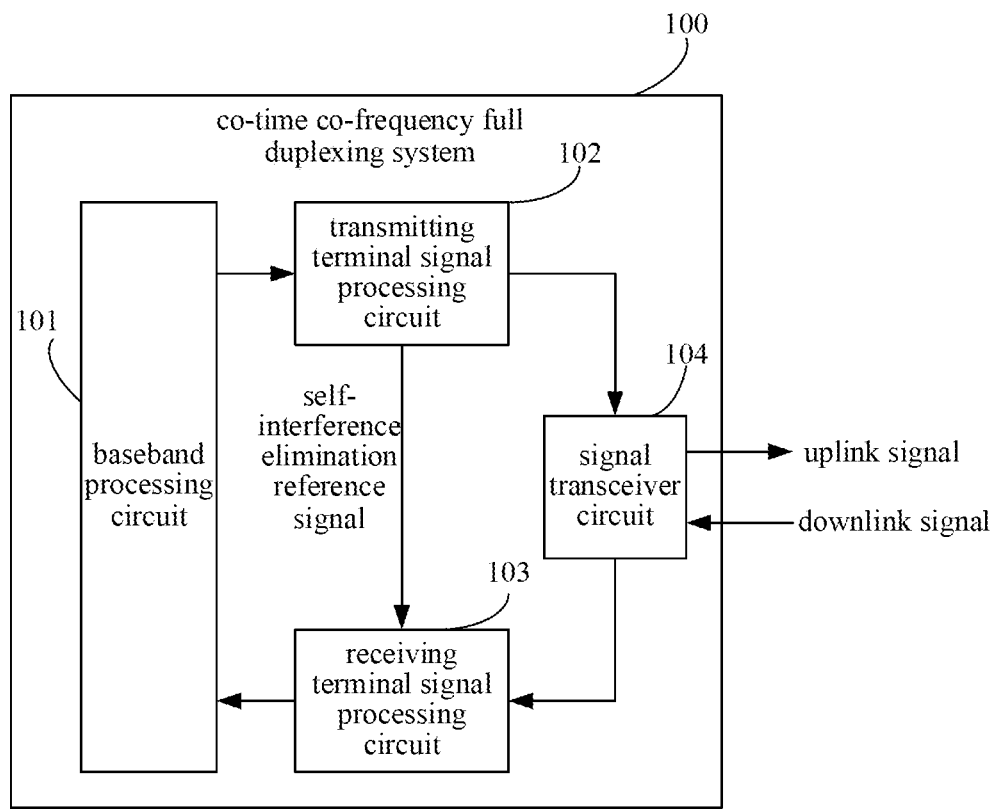
FIG. 1 is a schematic view showing a co-time co-frequency full duplexing system according to an embodiment of the present invention.

In one aspect, the present invention provides in some embodiments a co-time co-frequency full duplexing system 100 which, as shown in FIG. 1, includes a baseband processing circuit 101, a transmitting terminal signal processing circuit 102, a receiving terminal signal processing circuit 103 and a signal transceiver circuit 104.

The transmitting terminal signal processing circuit 102 and the receiving terminal signal processing circuit 103 may be both electrically connected to the baseband processing circuit 101, and the signal transceiver circuit 104 may be electrically connected to the transmitting terminal signal processing circuit 102 and the receiving terminal signal processing circuit 103. To be specific, a first end of the baseband processing circuit 101 may be electrically connected to a first end of the transmitting terminal signal processing circuit 102, a second end of the transmitting terminal signal processing circuit 102 may be electrically connected to a first end of the signal transceiver circuit 104, a second end of the baseband processing circuit 101 may be electrically connected to a first end of the receiving terminal signal processing circuit 103, and a second end of the receiving terminal signal processing circuit 103 may be electrically connected to a second end of the signal transceiver circuit 104.

The baseband processing circuit 101 is used for encoding a to-be-transmitted uplink signal, or decoding a received downlink signal.

The transmitting terminal signal processing circuit 102 is used for, e.g., converting and modulating the uplink signal outputted from the baseband processing circuit 101, and transmitting the processed uplink signal to the signal transceiver circuit 104.

The signal transceiver circuit 104 is used for transmitting the uplink signal outputted from the transmitting terminal signal processing circuit 102, and simultaneously receiving the uplink signal transmitted from a network device such as a base station or a communication satellite and, and transmitting the received downlink signal to the receiving terminal signal processing circuit 103. In a possible embodiment of the present invention, the signal transceiver circuit 104 is capable of isolating the uplink signal from the downlink signal, so as to reduce an interference caused by the uplink signal on the downlink signal.

The receiving terminal signal processing circuit 103 is used for, e.g., converting and demodulating the downlink signal outputted from the signal transceiver circuit 104, and transmitting the processed downlink signal to the baseband processing circuit 101, so that the baseband processing circuit 101 may, e.g., decode the downlink signal.

In the embodiments of the present invention, the signal transceiver circuit 104 may transmit the uplink signal and receive the downlink signal simultaneously, and isolate the uplink signal from the downlink signal. As a result, it is able to receive and transmit the signals and isolate the signals from each other through one signal transceiver circuit, so as to simplify a link of the co-time co-frequency full duplexing system 100, and reduce the cost.

As shown in FIG. 1, in the embodiments of the present invention, the transmitting terminal signal processing circuit 102 may be further electrically connected to the receiving terminal signal processing circuit 103. To be specific, a third end of the transmitting terminal signal processing circuit 102 may be electrically connected to a third end of the receiving terminal signal processing circuit 103. When the transmitting terminal signal processing circuit 102 processes the uplink signal received from the baseband processing circuit 101, the transmitting terminal signal processing circuit 102 may further extract envelope information (e.g., an amplitude parameter and a phase parameter) about the uplink signal to form a self-interference elimination reference signal, and transmit the self-interference elimination reference signal to the receiving terminal signal processing circuit 103. In this way, when the uplink signal and the downlink signal are mixed together and enter the receiving terminal signal processing circuit 103, the uplink signal may be suppressed through the self-interference elimination reference signal, so it is able to reduce the interference caused by the uplink signal on the downlink signal.

To be specific, the transmitting terminal signal processing circuit may include a transmitting terminal digital signal processing circuit 1021 and a transmitting terminal analog signal processing circuit 1022.

Figure 2:
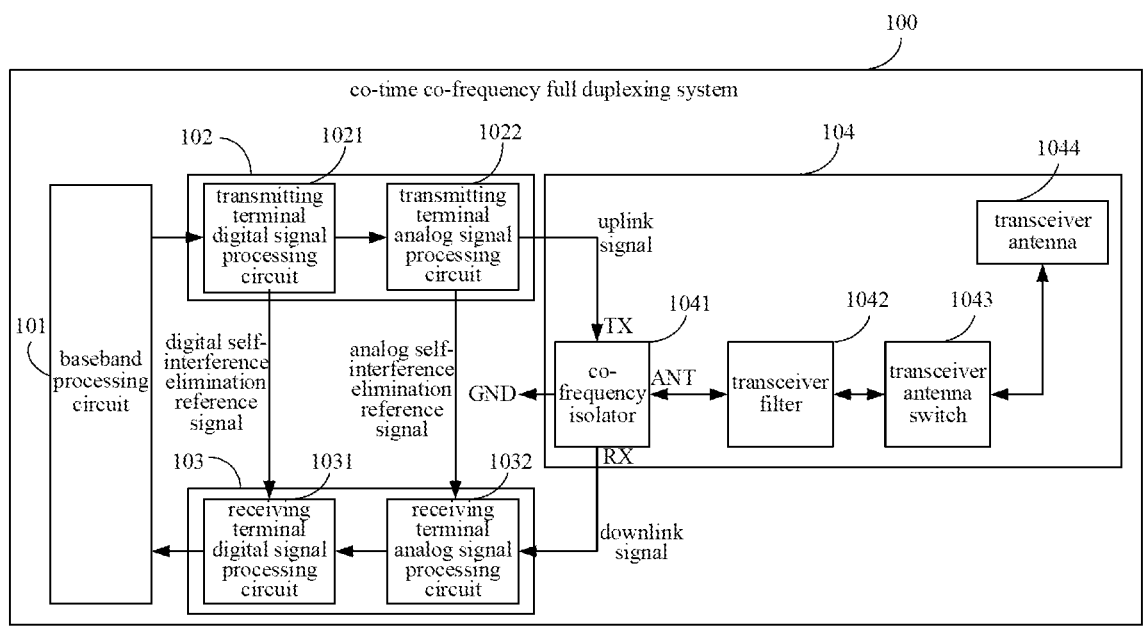
FIG. 2 is another schematic view showing the co-time co-frequency full duplexing system according to an embodiment of the present invention.

As shown in FIG. 2, the baseband processing circuit 101 may be electrically connected to the transmitting terminal digital signal processing circuit 1021, the transmitting terminal digital signal processing circuit 1021 may be electrically connected to the transmitting terminal analog signal processing circuit 1022, and the transmitting terminal analog signal processing circuit 1022 may be electrically connected to the signal transceiver circuit 104 in turn. To be specific, a first end of the transmitting terminal digital signal processing circuit 1021 may be electrically connected to the first end of the baseband processing circuit 101, a second end of the transmitting terminal digital signal processing circuit 1021 may be electrically connected to a first end of the transmitting terminal analog signal processing circuit 1022, and a second end of the transmitting terminal analog signal processing circuit 1022 may be electrically connected to the first end of the signal transceiver circuit 104.

The transmitting terminal digital signal processing circuit 1021 is used for receiving the uplink signal transmitted from the baseband processing circuit 101, subjecting the received uplink signal to the digitalization process, and transmitting the resultant uplink signal to the transmitting terminal analog signal processing circuit 1022. The transmitting terminal analog signal processing circuit 1022 is used for up-converting and modulating the uplink signal received from the transmitting terminal digital signal processing circuit 1021, and transmitting the resultant uplink signal to the signal transceiver circuit 104.

The baseband processing circuit is used for providing a to-be-transmitted useful uplink signal. The transmitting terminal digital signal processing circuit 1021 is further used for receiving the uplink signal transmitted from the baseband processing circuit 101, subjecting the received uplink signal to the digitalization process, and transmitting the resultant uplink signal to the transmitting terminal analog signal processing circuit 1022. Then, the transmitting terminal analog signal processing circuit 1022 is further used for converting the uplink signal from a digital signal to an analog signal, up-converting and modulating the analog signal, and then transmitting the resultant uplink signal to the signal transceiver circuit 104. The signal transceiver circuit 104 is further used for transmitting the uplink signal to the network device such as the base station or the communication satellite.

To be specific, the receiving terminal signal processing circuit 103 may include a receiving terminal digital signal processing circuit 1031 and a receiving terminal analog signal processing circuit 1032.

As shown in FIG. 2, the baseband processing circuit 101 may be electrically connected to the receiving terminal digital signal processing circuit 1031, the receiving terminal digital signal processing circuit 1031 may be electrically connected to the receiving terminal analog signal processing circuit 1032, and the receiving terminal analog signal processing circuit 1032 may be electrically connected to the signal transceiver circuit 104 in turn. To be specific, a first end of the receiving terminal digital signal processing circuit 1031 may be electrically connected to the first end of the baseband processing circuit 101, a second end of the receiving terminal digital signal processing circuit 1031 may be electrically connected to a first end of the receiving terminal analog signal processing circuit 1032, and a second end of the receiving terminal analog signal processing circuit 1032 may be electrically connected to the second end of the signal transceiver circuit 104.

The receiving terminal analog signal processing circuit 1032 is further used for receiving the downlink signal transmitted from the signal transceiver circuit 104, down-converting and demodulating the downlink signal, and transmitting the resultant downlink signal to the receiving terminal digital signal processing circuit 1031. The receiving terminal digital signal processing circuit 1031 is used for subjecting the downlink signal received from the receiving terminal analog signal processing circuit 1032 to a digitalization process, and transmitting the resultant downlink signal to the baseband processing circuit 101.

The signal transceiver circuit is further used for receiving a useful downlink signal transmitted from the network device such as the base station and the communication satellite. The receiving terminal analog signal processing circuit 1032 is further used for receiving the downlink signal outputted from the signal transceiver circuit 104, down-converting and demodulating the downlink signal, and transmitting the resultant downlink signal to the receiving terminal digital signal processing circuit 1031. The receiving terminal digital signal processing circuit 1031 is further used for subjecting the downlink signal to the digitalization process, and transmitting the resultant downlink signal to the baseband processing circuit 101.

As shown in FIG. 2, the transmitting terminal digital signal processing circuit 1021 may be further electrically connected to the receiving terminal digital signal processing circuit 1031, and the transmitting terminal analog signal processing circuit 1022 may be further electrically connected to the receiving terminal analog signal processing circuit 1032. To be specific, a third end of the transmitting terminal digital signal processing circuit 1021 may be electrically connected to a third end of the receiving terminal digital signal processing circuit 1031, and a third end of the transmitting terminal analog signal processing circuit 1022 may be electrically connected to a third end of the receiving terminal analog signal processing circuit 1032.

The transmitting terminal digital signal processing circuit 1021 is further used for, when subjecting the uplink signal to the digitalization process, extracting a digital self-interference elimination reference signal of the uplink signal, and transmitting the digital self-interference elimination reference signal to the receiving terminal digital signal processing circuit 1031. The transmitting terminal analog signal processing circuit 1022 is further used for, when up-converting and modulating the uplink signal, extracting an analog self-interference elimination reference signal of the uplink signal, and transmitting the analog self-interference elimination reference signal to the receiving terminal analog signal processing circuit 1032.

The digital self-interference elimination reference signal may be a reference signal generated in accordance with the envelope information (e.g., the amplitude parameter and the phase parameter) about the uplink signal extracted by the transmitting terminal digital signal processing circuit 1021, and the analog self-interference elimination reference signal may be a reference signal generated in accordance with the envelope information (e.g., the amplitude parameter and the phase parameter) about the uplink signal extracted by the transmitting terminal analog signal processing circuit 1022.

To be specific, when receiving the useful downlink signal transmitted from the network device such as the base station or the communication satellite, the signal transceiver circuit 104 may receive a part of the uplink signal leaked from a transmission path simultaneously. The leaked uplink signal and the useful downlink signal may be mixed together to form a self-interference. In order to suppress the interference caused by the uplink signal, the transmitting terminal digital signal processing circuit 1021 may, when processing the uplink signal, extract the envelop information about the uplink signal as the digital self-interference elimination reference signal, and the transmitting terminal analog signal processing circuit 1022 may, when processing the uplink signal, extract the envelop information about the uplink signal as the analog self-interference elimination reference signal. In this regard, when the downlink signal mixed with the uplink signal passes through the receiving terminal analog signal processing circuit 1032, a part of the uplink reference signal may be eliminated under the effect of the analog self-interference elimination reference signal, and when the downlink signal mixed with the uplink signal passes through the receiving terminal digital signal processing circuit 1031, the uplink reference signal may be further eliminated under the effect of the digital self-interference elimination reference signal, so as to achieve the self-interference suppression.

Further, the signal transceiver circuit 104 may include a co-frequency isolator 1041, a transceiver filter 1042, an antenna switch 1043 and a transceiver antenna 1044.

As shown in FIG. 2, the transmitting terminal analog signal processing circuit 1022 and the receiving terminal digital signal processing circuit 1031 may be electrically connected to the co-frequency isolator 1041, the co-frequency isolator 1041 may be electrically connected to the transceiver filter 1042, the transceiver filter 1042 may be electrically connected to the antenna switch 1043, and the antenna switch 1043 may be electrically connected to the transceiver antenna 1044 in turn. To be specific, a first end of the co-frequency isolator 1041 may be electrically connected to the second end of the transmitting terminal analog signal processing circuit 1022, a second end of the co-frequency isolator 1041 may be electrically connected to the second end of the receiving terminal digital signal processing circuit 1031, a third end of the co-frequency isolator 1041 may be electrically connected to the first end of the transceiver filter 1042, a second end of the transceiver filter 1042 may be electrically connected to the first end of the antenna switch 1043, and a second end of the antenna switch 1043 may be electrically connected to the transceiver antenna 1044.

Upon the co-frequency isolator 1041 receives the uplink signal transmitted from the transmitting terminal analog signal processing circuit 1022, the co-frequency isolator 1041 is further used for transmitting the uplink signal to the transceiver filter 1042. The transceiver filter 1042 is further used for filtering the uplink signal transmitted from the co-frequency isolator 1041. The antenna switch 1043 is used for transmitting the uplink signal filtered by the transceiver filter 1042 to the transceiver antenna 1044. The transceiver antenna 1044 is used for transmitting the uplink signal transmitted from the antenna switch 1043.

Upon the transceiver antenna 1044 receives the downlink signal, the transceiver antenna 1044 is further used for transmitting the received downlink signal to the antenna switch 1043. The antenna switch 1043 is further used for transmitting the downlink signal transmitted from the transceiver antenna 1044 to the transceiver filter 1042. The transceiver filter 1042 is further used for filtering the downlink signal transmitted from the antenna switch 1043, and transmitting the filtered downlink signal to the co-frequency isolator 1041. The co-frequency 1041 is further used for isolating the transmission and reception of the uplink signal from the transmission and reception of the downlink signal.

In other words, the transmitting terminal analog signal processing circuit 1022 may transmit the processed uplink signal to the co-frequency isolator 1041. Upon the receipt of the uplink signal, the co-frequency isolator 1041 may transmit the uplink signal to the transceiver filter 1042 for filtration. The filtered uplink signal may be transmitted through the antenna switch 1043 to the transceiver antenna 1044, and then the transceiver antenna 1044 may transmit the uplink signal. Simultaneously, the transceiver antenna 1044 may receive the downlink signal and transmit, through the antenna switch 1043, the downlink signal to the transceiver filter 1042 for filtration. The filtered downlink signal may be transmitted to the co-frequency isolator 1041, and the co-frequency isolator 1041 may isolate the transmission and reception of the uplink signal from the transmission and reception of the downlink signal, so as to suppress the interference caused by the uplink signal on the downlink signal.

Figure 3:
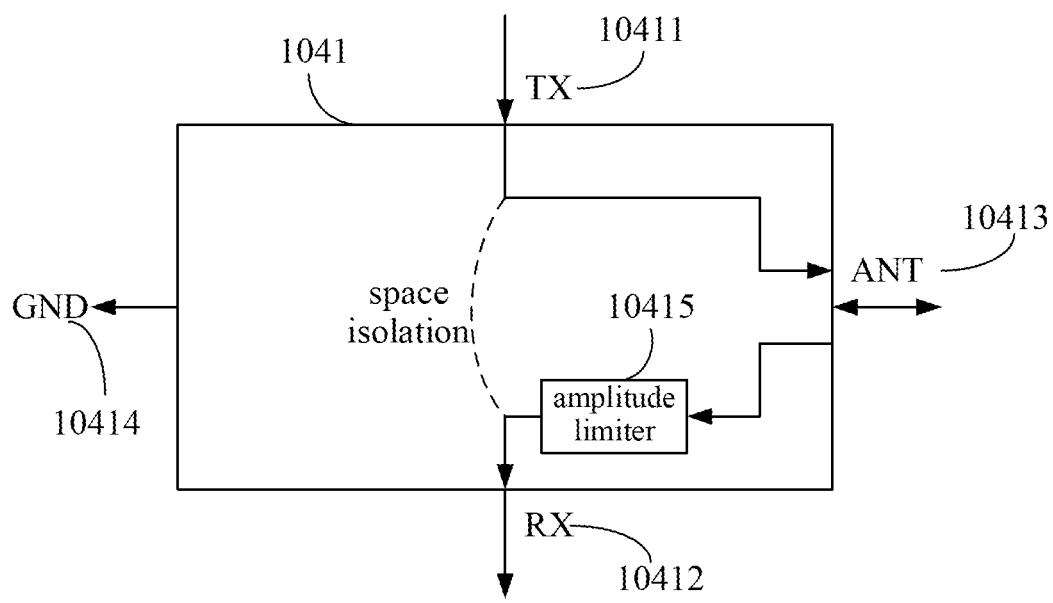
FIG. 3 is a schematic view showing a co-frequency isolator according to an embodiment of the present invention.

To be specific, as shown in FIG. 3, the co-frequency isolator 1041 may include a transmission pin 10411, a reception pin 10412, an antenna pin 10413 and a load-grounded pin 10414.

The transmission pin 10411 may be electrically connected to the transmitting terminal analog signal processing circuit 1022 (to be specific, the transmission pin 10411 may be electrically connected to the second end of the transmitting terminal analog signal processing circuit 1022), and the transmission pin 10411 may be connected to the antenna pin 10413 to form a transmission path for the uplink signal. The reception pin 10412 may be electrically connected to the receiving terminal analog signal processing circuit 1032 (to be specific, the reception pin 10412 may be electrically connected to the second end of the receiving terminal analog signal processing circuit 1032), and the reception pin 10412 may be connected to the antenna pin 10413 to form a reception path for the downlink signal. The antenna pin 10413 may be electrically connected to the transceiver filter 1042. The load-grounded pin 10414 may be connected to a housing of the co-frequency isolator 1041, or electrically connected to a ground end in an internal circuit of the co-frequency isolator 1041.

In the embodiments of the present invention, the co-frequency isolator 1041 may be a novel four-port device. The transmission pin 10411 (i.e., a TX pin in FIG. 3) may function as to input the uplink signal, the reception pin 10412 (i.e., an RX pin in FIG. 3) may function as to output the downlink signal, the antenna pin 10413 (i.e., an ANT pin in FIG. 3) may function as to output the uplink signal and input the downlink signal, and the load-grounded pin 10414 (GND) may function as to provide a reference ground for the co-frequency isolator 1041.

Apart from the above four pins, the co-frequency isolator 1041 may further include a transmission path and a reception path. The transmission path may be connected to the transmission pin 10411 and the antenna pin 10413, and the reception path may be connected to the reception pin 10412 and the antenna pin 10413. The transmission path and the reception path may each be a one-way path. The transmission path is arranged in such a manner as to merely allow the signal to be transmitted from the transmission pin 10411 to the antenna pin 10413, rather than from the antenna pin 10413 to the transmission pin 10411, and the reception path is arranged in such a manner as to merely allow the signal to be transmitted from the antenna pin 10413 to the reception pin 10412, rather than from the reception pin 10412 to the antenna pin 10413.

The transmission path and the reception path may each be implemented through a transmission line within the co-frequency isolator 1041, i.e., each of the transmission path and the reception path may be formed by a transmission line. Due to a small load of the transmission line, it is able to reduce the loss of the load power and reduce the insertion loss.

Further, in the embodiments of the present invention, a line spatial distance between the transmission pin 10411 and the reception pin 10412 and a line spatial distance between the transmission path and the reception path may each be greater than or equal to three times of a line width, so as to provide a space isolation greater than 40 dB, thereby to enable the co-frequency isolator 1041 to isolate the uplink signal from the downlink signal. The space isolation may be not smaller than an amplitude suppression value of an amplitude limiter 10415.

As shown in FIG. 3, in the embodiments of the present invention, the reception path may be further connected to the amplitude limiter 10415. The amplitude limiter 10415 mainly functions as to limit an amplitude of an inputted signal, and output a signal with a fixed amplitude. In this regard, when an uplink signal having a large signal intensity (e.g., 20 dBm) and a downlink signal having a small signal intensity (e.g., −70 dBm) enter the amplitude limiter 10415 of the reception path simultaneously, the uplink signal may be limited to the fixed amplitude, so as to reduce the interference caused by the uplink signal on the downlink signal. In addition, because the amplitude of the uplink signal entering the reception channel is reduced, relatively small non-linear distortion may be generated by a back-end circuit due to saturation, so it is also able to ensure the self-interference elimination performance of the back-end circuit.

For example, suppose that output power of the amplitude limiter 10415 is designed as −10 dBm and an uplink signal of 26 dBm enters the reception path through the antenna pin 10413, an uplink interference signal of −10 dBm may be outputted after the uplink signal is processed by the amplitude limiter 10415, equivalent to the addition of the self-interference suppression of 36 dB.

Finally, it should be appreciated that, depending on the requirement of a specific link index, a position of the transceiver filter 1042 and a position of the co-frequency isolator 1041 may be exchanged. For example, when the filter is located on the left, an out-of-band spurious signal generated by a previous-stage circuit may be suppressed at first, so as to ensure the performance of the co-frequency isolator 1041. When the out-of-band spurious signal generated by the previous-stage circuit is relatively low, the co-frequency isolator 1041 may be located before the filter.

In a word, according to the co-time co-frequency full duplexing system 100 in the embodiments of the present invention, it is able to implement the transmission in a co-time co-frequency full duplexing manner merely through one antenna, one antenna switch 1043 and one transceiver filter 1042, thereby to reduce the link complexity as well as the cost. In addition, under the effect of the amplitude limiter 10415 in the co-frequency isolator 1041, it is able to acquire a better co-frequency self-interference suppression index, thereby to improve a self-interference elimination level of the system.

In another aspect, the present invention further provides in some embodiments a mobile terminal including the above-mentioned co-time co-frequency full duplexing system 100.

According to the mobile terminal in the embodiments of the present invention, the co-time co-frequency full duplexing system 100 may transmit the uplink signal and receive the downlink signal through one signal transceiver circuit 104, and isolate the uplink signal from the downlink signal so as to achieve the self-interference suppression. As a result, it is able to reduce the link complexity for the co-time co-frequency full duplexing system 100, thereby to reduce the cost.

The present invention further provides in some embodiments a mobile terminal 400. The mobile terminal 400 may be a mobile phone, a flat-panel computer, a Personal Digital Assistant (PDA) or a vehicle-mounted computer.

Figure 4:
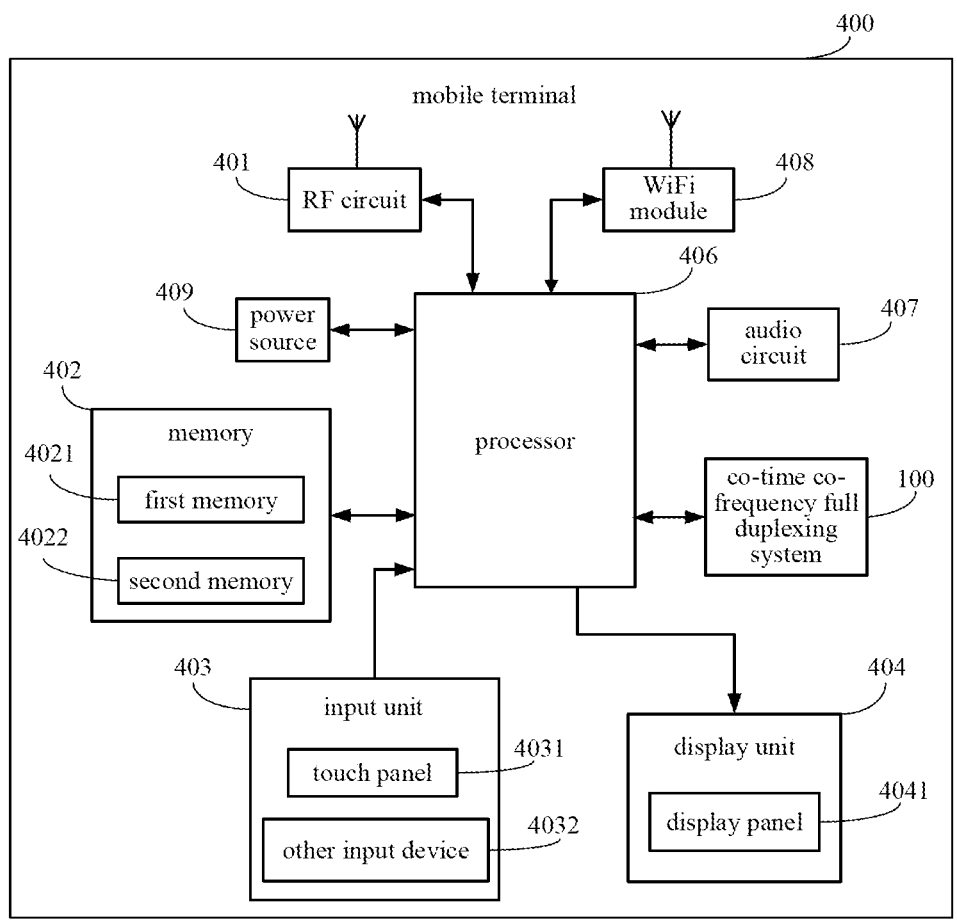
FIG. 4 is a block diagram of a mobile terminal according to an embodiment of the present invention.

As shown in FIG. 4, the mobile terminal 400 may include a Radio Frequency (RF) circuit 401, a memory 402, an input unit 403, a display unit 404, a processor 406, an audio circuit 407, a Wireless Fidelity (WiFi) module 408 and a power source 409.

The input unit 403 is used for receiving digital or character information inputted by a user, and generating a signal input related to user settings and function control of the mobile terminal 400. To be specific, in the embodiment of the present invention, the input unit 403 may include a touch panel 4031. The touch panel 4031, also called as touch screen, is used for collecting a touch operation made by the user on or in proximity to the touch panel (e.g., an operation made by the user through any appropriate object or attachment (e.g., finger or stylus) on or in the proximity to the touch panel 4031), and driving a corresponding connection device in accordance with a predetermined program. Optionally, the touch panel 4031 may include a touch detection unit and a touch controller. The touch detection device is used for detecting a touch position of the user, and a signal generated due to the touch operation, and transmitting the signal to the touch controller. The touch controller is used for receiving touch information from the touch detection device, converting it into coordinates of a touch point, transmit the coordinates to the processor 406, and receiving and executing a command from the processor 406. In addition, the touch panel 4031 may be of a resistive type, a capacitive type, an infrared type or a surface acoustic wave (SAW) type. Apart from the touch panel 4031, the input unit 403 may further include another input device 4032 which may include, but not limited to, one or more of a physical keyboard, a functional button (e.g., a volume control button or an on/off button), a trackball, a mouse, and a joystick.

The display unit 404 is used for displaying information inputted by the user or information to be presented to the user, and various menu interfaces for the mobile terminal 400, and it may include a display panel 4041. In a possible embodiment of the present invention, the display panel 4041 may be a Liquid Crystal Display (LCD) panel or an Organic Light-Emitting Diode (OLED) panel.

It should be appreciated that, the touch panel 4031 may cover the display panel 4041, so as to form a touch display panel. When the touch operation made on or in proximity to the touch display panel has been detected, the touch information may be transmitted to the processor 406 so as to determine a type of a touch event. Then, the processor 406 may provide corresponding visual output on the touch display screen in accordance with the type of the touch event.

The touch display panel may include an application interface display region and a commonly-used controls display region. An arrangement mode of the two display regions will not be particularly defined herein, e.g., one of the two display regions may be arranged above or under the other, or arranged to the left or the right of the other, so as to distinguish the two display regions from each other. The application interface display region may be adopted to display interfaces for applications, and each interface may include an icon for at least one application and/or an interface element such as Widget desktop control. The application interface display region may also be a blank interface where no content is contained. The commonly-used controls display region may be adopted to display controls which are used frequently, e.g., setting button, interface number, scroll bar, or such application icons as telephone book icon.

The processor 406 may be a control center of the mobile terminal 400, and connected to each member of the entire mobile phone via various interfaces and lines. The processor 406 is used for running or executing software programs and/or modules stored in a first memory 4021, and calling data stored in a second memory 4022, so as to achieve various functions of the mobile terminal 400 and process the data, thereby to monitor the mobile terminal 400 as a whole. In a possible embodiment of the present invention, the processor 406 may include one or more processing units.

In the embodiments of the present invention, a software program and/or module stored in the first memory 4021 and/or the data stored in the second memory 4022 are called.

As shown in FIG. 1, in the embodiments of the present invention, the mobile terminal may further include the co-time co-frequency full duplexing system 100. The co-time co-frequency full duplexing system 100 may include the baseband processing circuit 101, the transmitting terminal signal processing circuit 102, the receiving terminal signal processing circuit 103 and the signal transceiver circuit 104. The first end of the baseband processing circuit 101 may be electrically connected to the first end of the transmitting terminal signal processing circuit 102, the second end of the transmitting terminal signal processing circuit 102 may be electrically connected to the first end of the signal transceiver circuit 104, the second end of the baseband processing circuit 101 may be electrically connected to the first end of the receiving terminal signal processing circuit 103, and the second end of the receiving terminal signal processing circuit 103 may be electrically connected to the second end of the signal transceiver circuit 104. The signal transceiver circuit 104 is used for transmitting an uplink signal and receiving a downlink signal simultaneously, and isolating the uplink signal from the downlink signal.

Further, as shown in FIG. 1, the third end of the transmitting terminal signal processing circuit 102 may be electrically connected to the third end of the receiving terminal signal processing circuit 103.

The transmitting terminal signal processing circuit 102 is further used for, upon the receipt of the uplink signal transmitted from the baseband processing circuit 101, extracting a self-interference elimination reference signal of the uplink signal, and transmitting the self-interference elimination reference signal to the receiving terminal signal processing circuit 103.

Further, as shown in FIG. 2, the transmitting terminal signal processing circuit 102 may include a transmitting terminal digital signal processing circuit 1021 and a transmitting terminal analog signal processing circuit 1022. A first end of the transmitting terminal digital signal processing circuit 1021 may be electrically connected to the first end of the baseband processing circuit 101, a second end of the transmitting terminal digital signal processing circuit 1021 may be electrically connected to a first end of the transmitting terminal analog signal processing circuit 1022, and a second end of the transmitting terminal analog signal processing circuit 1022 may be electrically connected to the first end of the signal transceiver circuit 104.

The transmitting terminal digital signal processing circuit 1021 is used for receiving the uplink signal transmitted from the baseband processing circuit 101, subjecting the received uplink signal to the digitalization process, and transmitting the resultant uplink signal to the transmitting terminal analog signal processing circuit 1022. The transmitting terminal analog signal processing circuit 1022 is used for up-converting and modulating the uplink signal received from the transmitting terminal digital signal processing circuit 1021, and transmitting the resultant uplink signal to the signal transceiver circuit 104.

Further, as shown in FIG. 2, the receiving terminal signal processing circuit 103 may include a receiving terminal digital signal processing circuit 1031 and a receiving terminal analog signal processing circuit 1032. A first end of the receiving terminal digital signal processing circuit 1031 may be electrically connected to the first end of the baseband processing circuit 101, a second end of the receiving terminal digital signal processing circuit 1031 may be electrically connected to a first end of the receiving terminal analog signal processing circuit 1032, and a second end of the receiving terminal analog signal processing circuit 1032 may be electrically connected to the second end of the signal transceiver circuit 104.

The receiving terminal analog signal processing circuit 1032 is further used for receiving the downlink signal transmitted from the signal transceiver circuit 104, down-converting and demodulating the downlink signal, and transmitting the resultant downlink signal to the receiving terminal digital signal processing circuit 1031. The receiving terminal digital signal processing circuit 1031 is used for subjecting the downlink signal received from the receiving terminal analog signal processing circuit 1032 to the digitalization, and transmitting the resultant downlink signal to the baseband processing circuit 101.

Further, as shown in FIG. 2, a third end of the transmitting terminal digital signal processing circuit 1021 may be electrically connected to a third end of the receiving terminal digital signal processing circuit 1031.

The transmitting terminal digital signal processing circuit 1021 is further used for, when subjecting the uplink signal to the digitalization process, extracting a digital self-interference elimination reference signal of the uplink signal, and transmitting the digital self-interference elimination reference signal to the receiving terminal digital signal processing circuit 1031.

Further, as shown in FIG. 2, a third end of the transmitting terminal analog signal processing circuit 1022 may be electrically connected to a third end of the receiving terminal analog signal processing circuit 1032.

The transmitting terminal analog signal processing circuit 1022 is further used for, when up-converting and modulating the uplink signal, extracting an analog self-interference elimination reference signal of the uplink signal, and transmitting the analog self-interference elimination reference signal to the receiving terminal analog signal processing circuit 1032.

Further, as shown in FIG. 2, the signal transceiver circuit 104 may include a co-frequency isolator 1041, a transceiver filter 1042, an antenna switch 1043 and a transceiver antenna 1044. A first end of the co-frequency isolator 1041 may be electrically connected to the second end of the transmitting terminal analog signal processing circuit 1022, a second end of the co-frequency isolator 1041 may be electrically connected to the second end of the receiving terminal digital signal processing circuit 1031, a third end of the co-frequency isolator 1041 may be electrically connected to the first end of the transceiver filter 1042, a second end of the transceiver filter 1042 may be electrically connected to the first end of the antenna switch 1043, and a second end of the antenna switch 1043 may be electrically connected to the transceiver antenna 1044.

Upon the co-frequency isolator 1041 receives the uplink signal transmitted from the transmitting terminal analog signal processing circuit 1022, the co-frequency isolator 1041 is used for transmitting the uplink signal to the transceiver filter 1042. The transceiver filter 1042 is further used for filtering the uplink signal transmitted from the co-frequency isolator 1041. The antenna switch 1043 is used for transmitting the uplink signal filtered by the transceiver filter 1042 to the transceiver antenna 1044. The transceiver antenna 1044 is used for transmitting the uplink signal transmitted from the antenna switch 1043.

Upon the transceiver antenna 1044 receives the downlink signal, the transceiver antenna 1044 is used for transmitting the received downlink signal to the antenna switch 1043. The antenna switch 1043 is further used for transmitting the downlink signal transmitted from the transceiver antenna 1044 to the transceiver filter 1042. The transceiver filter 1042 is further used for filtering the downlink signal transmitted from the antenna switch 1043, and transmitting the filtered downlink signal to the co-frequency isolator 1041. The co-frequency 1041 is further used for isolating the transmission and reception of the uplink signal from the transmission and reception of the downlink signal.

Further, as shown in FIG. 3, the co-frequency isolator 1041 may include a transmission pin 10411, a reception pin 10412, an antenna pin 10413 and a load-grounded pin 10414.

The transmission pin 10411 may be electrically connected to the second end of the transmitting terminal analog signal processing circuit 1022, and the transmission pin 10411 may be connected to the antenna pin 10413 to form a transmission path for the uplink signal. The reception pin 10412 may be electrically connected to the second end of the receiving terminal analog signal processing circuit 1032, and the reception pin 10412 may be connected to the antenna pin 10413 to form a reception path for the downlink signal. The antenna pin 10413 may be electrically connected to the transceiver filter 1042.

Further, the load-grounded pin 10414 may be connected to a housing of the co-frequency isolator 1041, or electrically connected to a ground end in an internal circuit of the co-frequency isolator 1041.

Further, as shown in FIG. 3, the reception path may be further connected to an amplitude limiter 10415.

Further, the transmission path may be formed by a transmission line.

Further, a line spatial distance between the transmission pin 10411 and the reception pin 10412 and a line spatial distance between the transmission path and the reception path may each be greater than or equal to three times of a line width.

In a word, according to the embodiments of the present invention, the mobile terminal 400 may transmit the uplink signal and receive the downlink signal through one signal transceiver circuit 104, and isolate the uplink signal from the downlink signal so as to achieve the self-interference suppression. As a result, it is able to reduce the link complexity, thereby to reduce the cost.

The above embodiments have been described in a progressive manner, and the same or similar contents in the embodiments will not be repeated, i.e., each embodiment merely focuses on the difference from the others.

Although the preferred embodiments of the present invention have been described above, a person skilled in the art may make modifications and alterations to these embodiments in accordance with the basic concept of the present invention. So, the attached claims are intended to include the preferred embodiments and all of the modifications and alterations that fall within the scope of the embodiments of the present invention.

In addition, it should be further appreciated that, such words as "first" and "second" are merely used to separate one entity or operation from another entity or operation, but are not necessarily used to represent or imply any relation or order between the entities or operations. In addition, such terms as "include" or "including" or any other variations involved in the present invention intend to provide non-exclusive coverage, so that a procedure, method, article or terminal device including a series of elements may also include other elements not listed herein, or may include any inherent elements of the procedure, method, article or device. If without any further limitations, for an element defined by such sentence as "including one . . . ", it is not excluded that the procedure, method, article or device including the element may also include another identical element.

The above embodiments are preferred embodiments of the present invention. It should be appreciated that, a person skilled in the art may make further modifications and improvements without departing from the principle of the present invention, and these modifications and improvements shall also fall within the scope of the present invention.

What is claimed is:

1. A co-time co-frequency full duplexing system, comprising a baseband processing circuit, a transmitting terminal signal processing circuit, a receiving terminal signal transmission circuit and a signal transceiver circuit, wherein
a first end of the baseband processing circuit is electrically connected to a first end of the transmitting terminal signal processing circuit, a second end of the transmitting terminal signal processing circuit is electrically connected to a first end of the signal transceiver circuit;
a second end of the baseband processing circuit is electrically connected to a first end of the receiving terminal signal processing circuit, and a second end of the receiving terminal signal processing circuit is electrically connected to a second end of the signal transceiver circuit,
wherein the signal transceiver circuit is used for transmitting an uplink signal and receiving a downlink signal simultaneously, and isolating the uplink signal from the downlink signal;
wherein the transmitting terminal signal processing circuit comprises a transmitting terminal digital signal processing circuit and a transmitting terminal analog signal processing circuit, wherein
a first end of the transmitting terminal digital signal processing circuit is electrically connected to the first end of the baseband processing circuit, a second end of the transmitting terminal digital signal processing circuit is electrically connected to a first end of the transmitting terminal analog signal processing circuit, and a second end of the transmitting terminal analog signal processing circuit is electrically connected to the first end of the signal transceiver circuit;
the transmitting terminal digital signal processing circuit is used for receiving the uplink signal transmitted from the baseband processing circuit, subjecting the received uplink signal to a digitalization process, and transmitting the digitalized uplink signal to the transmitting terminal analog signal processing circuit;
the transmitting terminal analog signal processing circuit is used for up-converting and modulating the uplink signal received from the transmitting terminal digital signal processing circuit, and transmitting the up-converted and modulated uplink signal to the signal transceiver circuit, wherein the receiving terminal signal processing circuit comprises a receiving terminal digital signal processing circuit and a receiving terminal analog signal processing circuit, wherein
a first end of the receiving terminal digital signal processing circuit is electrically connected to the first end of the baseband processing circuit, a second end of the receiving terminal digital signal processing circuit is electrically connected to a first end of the receiving terminal analog signal processing circuit, and a second end of the receiving terminal analog signal processing circuit is electrically connected to the second end of the signal transceiver circuit;
the receiving terminal analog signal processing circuit is used for receiving the downlink signal transmitted from the signal transceiver circuit, down-converting and demodulating the downlink signal, and transmitting the down-converted and demodulated downlink signal to the receiving terminal digital signal processing circuit;
the receiving terminal digital signal processing circuit is used for subjecting the downlink signal received from the receiving terminal analog signal processing circuit to the digitalization process, and transmitting the digitalized downlink signal to the baseband processing circuit,
wherein the signal transceiver circuit comprises a co-frequency isolator, a transceiver filter, an antenna switch and a transceiver antenna, wherein
a first end of the co-frequency isolator is electrically connected to the second end of the transmitting terminal analog signal processing circuit, a second end of the co-frequency isolator is electrically connected to the second end of the receiving terminal analog signal processing circuit, a third end of the co-frequency isolator is electrically connected to a first end of the transceiver filter, a second end of the transceiver filter is electrically connected to a first end of the antenna switch, and a second end of the antenna switch is electrically connected to the transceiver antenna;
wherein the co-frequency isolator is used for, when the co-frequency isolator receives the uplink signal transmitted from the transmitting terminal analog signal processing circuit, transmitting the uplink signal to the transceiver filter, the transceiver filter is used for filtering the uplink signal transmitted from the co-frequency isolator, the antenna switch is used for transmitting the uplink signal filtered by the transceiver filter to the transceiver antenna, and the transceiver antenna is used for transmitting the uplink signal transmitted from the antenna switch;
the transceiver antenna is further used for, when the transceiver antenna receives the downlink signal, transmitting the received downlink signal to the antenna switch, the antenna switch is further used for transmitting the downlink signal transmitted from the transceiver antenna to the transceiver filter, the transceiver filter is further used for filtering the downlink signal transmitted from the antenna switch and transmitting the filtered downlink signal to the co-frequency isolator, and the co-frequency isolator is further used for isolating the transmission and reception of the uplink signal from the transmission and reception of the downlink signal,
wherein the co-frequency isolator comprises a transmission pin, a reception pin, an antenna pin and a load-grounded pin, wherein the transmission pin is electrically connected to the second end of the transmitting terminal analog signal processing circuit, and the transmission pin is connected to the antenna pin to form a transmission path for the uplink signal; and the reception pin is electrically connected to the second end of the receiving terminal analog signal processing circuit, the reception pin is connected to the antenna pin to form a reception path for the downlink signal and the antenna pin is electrically connected to the transceiver filter, wherein a line spatial distance between the transmission pin and the reception pin and a line spatial distance between the transmission path and the reception path are each greater than or equal to three times of a line width.

2. The co-time co-frequency full duplexing system according to claim 1, wherein a third end of the transmitting terminal digital signal processing circuit is electrically connected to a third end of the receiving terminal digital signal processing circuit;

the transmitting terminal digital signal processing circuit is further used for, when subjecting the uplink signal to the digitalization process, extracting a digital self-interference elimination reference signal of the uplink signal, and transmitting the digital self-interference elimination reference signal to the receiving terminal digital signal processing circuit.

3. The co-time co-frequency full duplexing system according to claim 1, wherein a third end of the transmitting terminal analog signal processing circuit is electrically connected to a third end of the receiving terminal analog signal processing circuit;

the transmitting terminal analog signal processing circuit is further used for, when up-converting and modulating the uplink signal, extracting an analog self-interference elimination reference signal of the uplink signal, and transmitting the analog self-interference elimination reference signal to the receiving terminal analog signal processing circuit.

4. The co-time co-frequency full duplexing system according to claim 1, wherein the load-grounded pin is connected to a housing of the co-frequency isolator, or electrically connected to a ground end in an internal circuit of the co-frequency isolator.

5. The co-time co-frequency full duplexing system according to claim 1, wherein the reception path is connected with an amplitude limiter.

6. The co-time co-frequency full duplexing system according to claim 1, wherein the transmission path is formed by a transmission line.

7. A mobile terminal, comprising the co-time co-frequency full duplexing system according to claim 1.

8. The mobile terminal according to claim 7, wherein a third end of the transmitting terminal digital signal processing circuit is electrically connected to a third end of the receiving terminal digital signal processing circuit;

the transmitting terminal digital signal processing circuit is further used for, when subjecting the uplink signal to the digitalization process, extracting a digital self-interference elimination reference signal of the uplink signal, and transmitting the digital self-interference elimination reference signal to the receiving terminal digital signal processing circuit.

9. The mobile terminal according to claim 7, wherein a third end of the transmitting terminal analog signal processing circuit is electrically connected to a third end of the receiving terminal analog signal processing circuit;

the transmitting terminal analog signal processing circuit is further used for, when up-converting and modulating the uplink signal, extracting an analog self-interference elimination reference signal of the uplink signal, and transmitting the analog self-interference elimination reference signal to the receiving terminal analog signal processing circuit.

10. The mobile terminal according to claim 7, wherein a third end of the transmitting terminal signal processing circuit is electrically connected to a third end of the receiving terminal signal processing circuit, wherein the transmitting terminal signal processing circuit is used for, upon receipt of the uplink signal transmitted from the baseband processing circuit, extracting a self-interference elimination reference signal of the uplink signal, and transmitting the self-interference elimination reference signal to the receiving terminal signal processing circuit.

11. The mobile terminal according to claim 7, wherein the load-grounded pin is connected to a housing of the co-frequency isolator, or electrically connected to a ground end in an internal circuit of the co-frequency isolator.

12. The mobile terminal according to claim 7, wherein the reception path is connected with an amplitude limiter.

13. The mobile terminal according to claim 7, wherein the transmission path is formed by a transmission line.

14. The co-time co-frequency full duplexing system according to claim 1, wherein a third end of the transmitting terminal signal processing circuit is electrically connected to a third end of the receiving terminal signal processing circuit, wherein the transmitting terminal signal processing circuit is used for, upon receipt of the uplink signal transmitted from the baseband processing circuit, extracting a self-interference elimination reference signal of the uplink signal, and transmitting the self-interference elimination reference signal to the receiving terminal signal processing circuit.

* * * * *